United States Patent [19]

Kennedy et al.

[11] Patent Number: 4,671,379
[45] Date of Patent: Jun. 9, 1987

[54] METHOD AND APPARATUS FOR GENERATING SEISMIC WAVES

[75] Inventors: William S. Kennedy, Palo Alto; Stephen J. Blumenkranz, Redwood City, both of Calif.

[73] Assignee: Petrophysical Services, Inc., Mountain View, Calif.

[21] Appl. No.: 771,719

[22] Filed: Sep. 3, 1985

[51] Int. Cl.$^4$ .............................................. G01V 1/40
[52] U.S. Cl. .................... 181/106; 181/113; 181/401; 367/25; 166/177
[58] Field of Search ............... 181/106, 113, 119, 401; 367/911, 912, 31, 83, 25; 166/177, 249

[56] References Cited

U.S. PATENT DOCUMENTS

| | | | |
|---|---|---|---|
| 2,281,751 | 5/1942 | Cloud | 181/106 |
| 2,433,746 | 12/1947 | Doll | 175/182 |
| 2,451,797 | 10/1948 | Blanchard | 177/386 |
| 3,221,833 | 12/1965 | Malmburg | 181/0.5 |
| 3,349,867 | 10/1967 | Mounce | 181/119 |
| 3,718,205 | 2/1973 | Fair et al. | 181/0.5 H |
| 3,730,269 | 5/1973 | Galle | 166/177 |
| 3,909,776 | 9/1975 | Broding et al. | 181/119 |
| 3,997,021 | 12/1976 | Chelminski | 181/106 |
| 4,033,429 | 7/1977 | Farr | 181/106 |
| 4,040,003 | 8/1977 | Beynet | 340/18 LD |

OTHER PUBLICATIONS

Doctorial thesis: *High Precision In Situ Measurement of Seismic Phase Velocity*, by Thomas Luca De Fazio, MIT, Feb. 1971.

*Primary Examiner*—Charles T. Jordan
*Assistant Examiner*—John W. Eldred
*Attorney, Agent, or Firm*—Robert E. Lowe

[57] ABSTRACT

A method and apparatus for generating a seismic wave in a borehole in the earth is disclosed. A portion of the borehole, which may be the bottom of the hole or any other point along its length, is selected as the site for seismic wave generation. A device is provided to oscillate the borehole fluid in a selected portion of the borehole to establish a resonant standing pressure wave of desired frequency within the fluid. The wave is maintained by continuing to supply energy to the fluid to replace losses due to fluid friction, structural losses and radiated acoustic energy. The standing wave thus created is radiated through the borehole wall into the earth and is eventually received by seismic detectors located on the surface.

23 Claims, 10 Drawing Figures

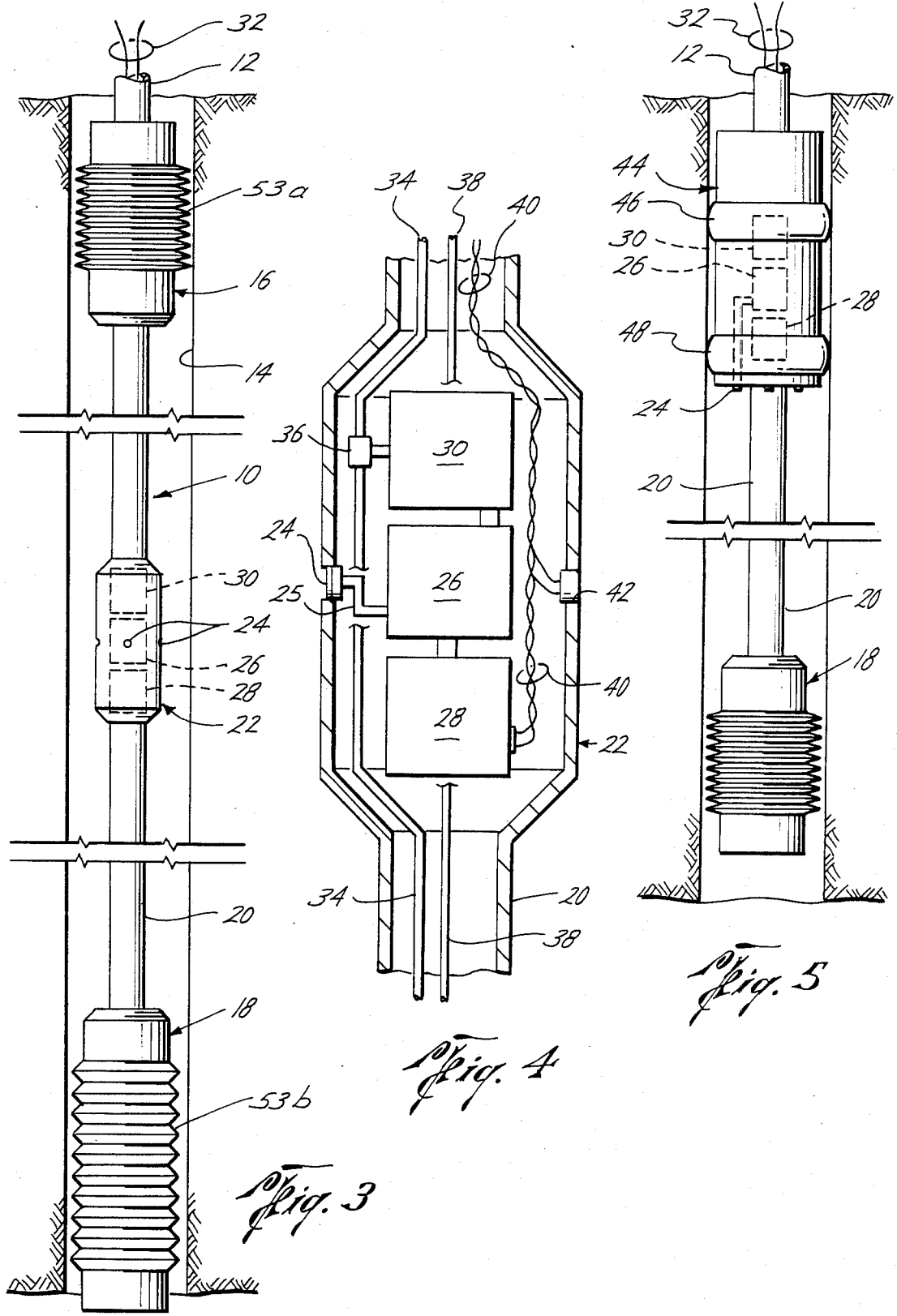

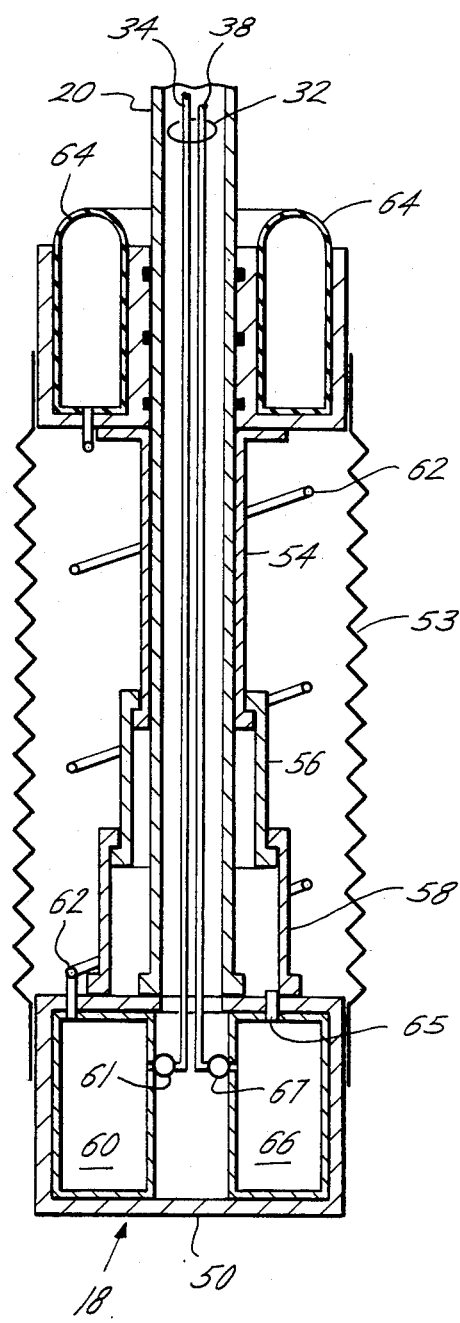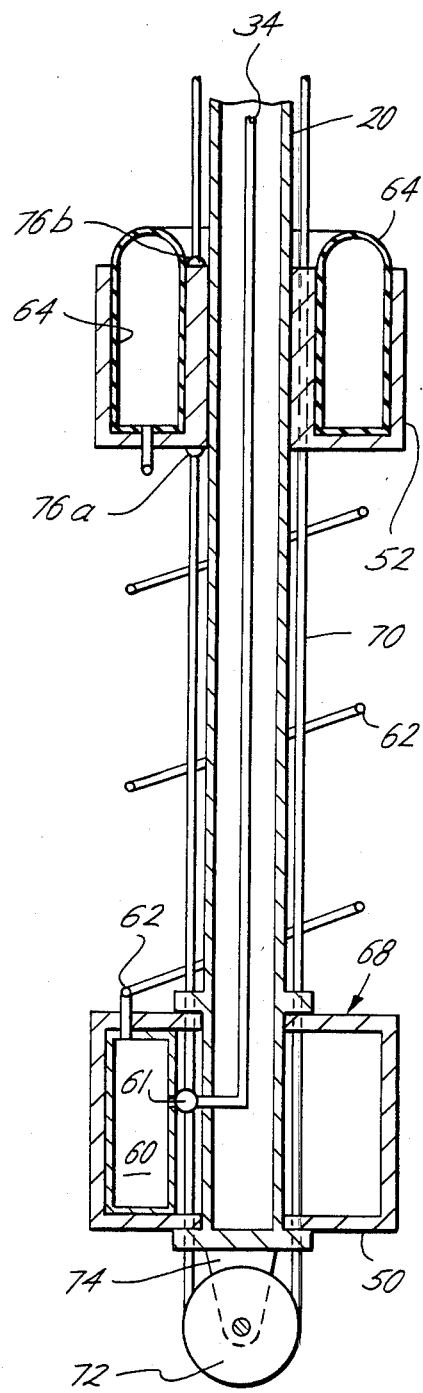

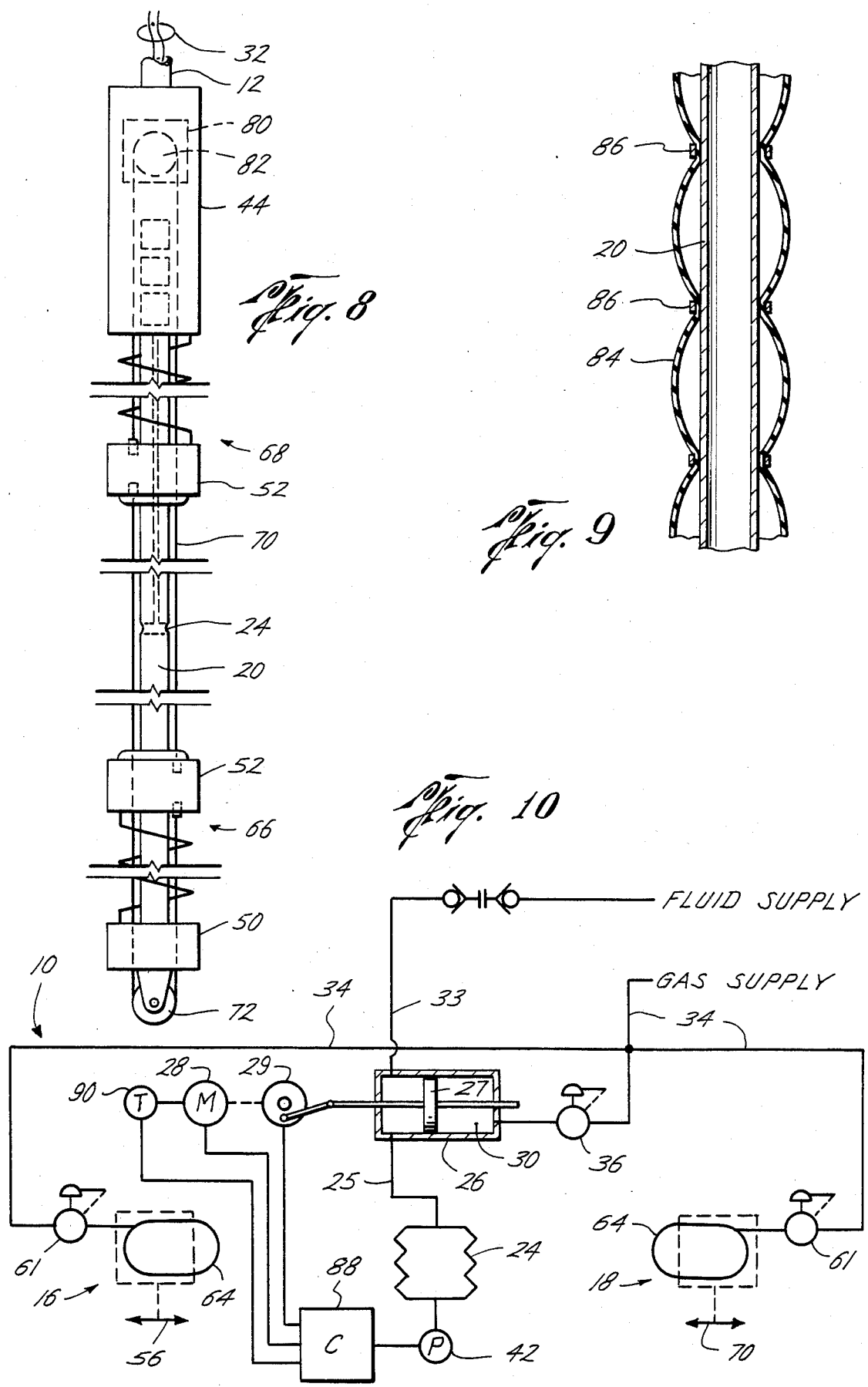

METHOD AND APPARATUS FOR GENERATING SEISMIC WAVES

BACKGROUND OF THE INVENTION

The present invention relates to techniques for generating seismic waves in the earth, and more particularly to techniques for generating seismic waves substantially below the surface of the earth, such as in a well borehole.

In the exploration for oil and gas it is desirable to discover as much as possible about the nature of the subsurface structure of the earth in the area of interest. Numerous techniques have been developed over the years to aid in generating such information. A commonly used and highly successful technique is that of seismic exploration wherein various sensors, called geophones, are placed in an array on the earth's surface. A seismic wave of some type is generated in the earth's surface in the vicinity of the geophones which then listen to and record the reflections of the wave from the various substrata in the earth. From such data, geologists and geophysicists are able to determine certain characteristics of the subsurface.

Once actual drilling of a well has begun in a selected site, it is typical to attempt to gather as much data as possible about the subsurface structure from the borehole itself. Accordingly, special instruments are lowered down the borehole from time to time to measure physical parameters such as electrical resistivity. Core samples are taken from the borehole wall from time to time and analyzed. Another useful technique is to place an array of geophones on the surfaace of the earth around the borehole and to generate a seismic wave deep in the borehole. This technique can give valuable additional information about the nature of the structure.

One of the major problems in the past has been techniques for generating such a seismic wave in the borehole. The use of explosives has been tried with limited application because the size of the charge required to generate a seismic wave of sufficient strength may also cause severe damage to the borehole itself. Several other techniques have been proposed such as dropping a heavy weight, usually attached to the drill string, on the bottom of the hole to generate the seismic wave. It has also been known to attach special devices to the end of the drill string which are rotated by the passage of drilling fluid through the drill string and emit a sound wave somewhat analogous to the operation of a siren or whistle.

None of the techniques described have proven to be entirely satisfactory and there remains a longstanding need within the industry for an improved method for generating a strong seismic wave down a borehole.

SUMMARY OF THE INVENTION

The present invention provides a method and apparatus for generating a seismic wave in the earth, the apparatus being located in a borehole. A portion of the borehole which may be the bottom of the hole or any other point along its length is selected as the site for seismic wave generation. A device is provided to oscillate the borehole fluid in a selected portion of the borehole to establish a resonant standing pressure wave of desired frequency within the fluid. The wave is maintained by continuing to supply energy to the fluid to replace losses due to fluid friction, structural losses and radiated acoustic energy. The standing wave thus created is radiated through the borehole wall into the earth and is eventually received by seismic detectors located on the surface.

The device can take various forms which are described in detail hereinafter. In general, either a half wave or quarter wave oscillator is selected. In the half wave type, a pair of compressible gas bladders are positioned in the borehole spaced apart a predetermined vertical distance. The fluid in the borehole space between the bladders is excited into oscillation to produce a resonant standing wave. In the quarter wave type, a single gas bladder is provided spaced vertically downhole a predetermined distance from a non-compressible blocking member. The fluid between the blocking member and the gas bladder is then excited into oscillation to produce a resonant standing wave.

An important feature of the invention is the creation of a resonant standing wave in a portion of a borehole by oscillating a borehole fluid between two vertically spaced apart end members, identified as compressible gas bladders in the preceding paragraph. However, the invention is not limited to gas bladders but includes other borehole techniques wherein an identifiable column of fluid is excited into resonant oscillation. By borehole fluid, we mean any of the various generally liquid fluids which may be present in or introduced into a borehole in the earth, including but not limited to drilling fluids, sometimes referred to as drilling mud, brine, water, oil, well completion fluids, and various mixtures thereof.

The ends of the fluid column will be defined by either a relatively compressible element or by a non-compressible element. When a relatively compressible element is used, it is selected and configured to have a lower acoustic impedance than the fluid in the column so that pressure waves striking it are reflected from the compressible element approximately 180° out of phase with the incident wave. The compressible element is preferably a gas bladder, but other compressible volumes may be used. When a non-compressible element is used, it is selected and configured to have a higher acoustic impedance than the fluid in the column so that pressure waves striking it are reflected approximately in phase with the incident wave. The appropriate selection of a compressible element or non-compressible element will become apparent as the specification proceeds.

An advantage of the present invention is high energy efficiency. Because the fluid column is made to oscillate at or near resonance a relatively large pressure oscillation can be produced with a relatively small amount of input power.

A further advantage of the present invention is that it provides an apparatus for use down a borehole wherein the resonant frequency can be easily changed so that seismic waves can be produced at selected ones of several frequencies or wide frequency bands can be swept as desired.

A more detailed explanation of the present invention will be provided by reference to the following description of the preferred embodiments and by reference to the drawing figures.

BRIEF DESCRIPTION OF THE DRAWINGS

FIG. 3 is a front elevation view of one embodiment of the device having bladders at each end and driving mechanism in the central portion of the device;

FIG. 4 is a vertical section enlarged view of the central portion of the device shown in FIG. 3;

FIG. 5 is a front elevational view of a second embodiment of the device having a gas bladder at only one end;

FIG. 6 is an enlarged section view of one end of the device showing one means for moving the bladder;

FIG. 7 is an enlarged section view of an alternate method for moving the gas bladders;

FIG. 8 illustrates an alternative embodiment of the device shown in FIG. 3;

FIG. 9 is a partial section view of the central portion of the device in an alternate embodiment;

FIG. 10 is a fluid schematic illustrating the operation of the device.

DESCRIPTION OF PREFERRED EMBODIMENTS

Figure 1:
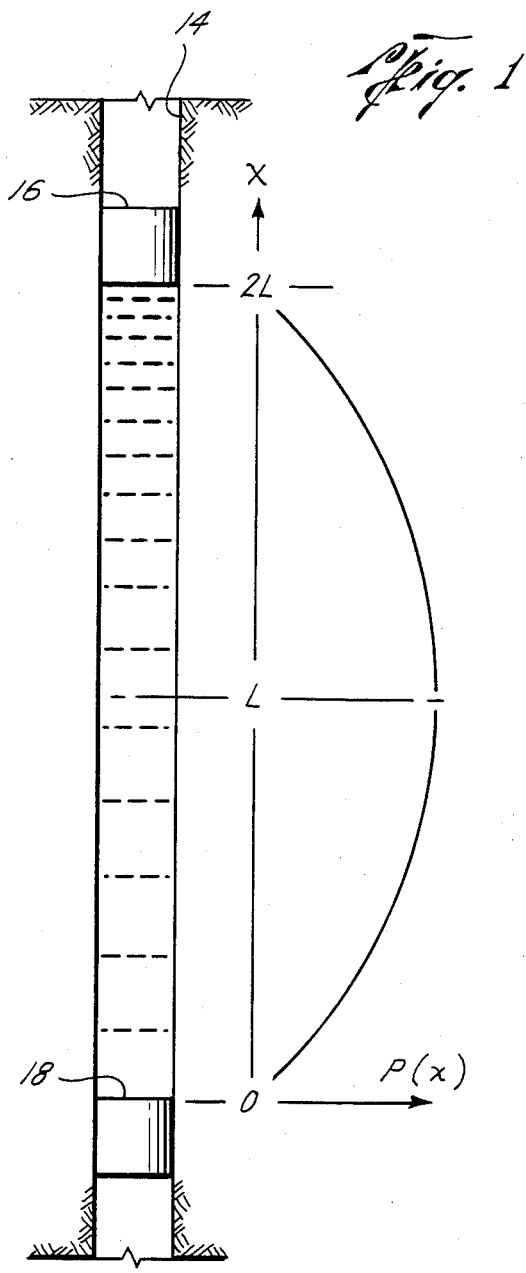
FIG. 1 is a schematic representation of the operation of the present method and apparatus within a borehole in the half wave configuration.
Figure 2:
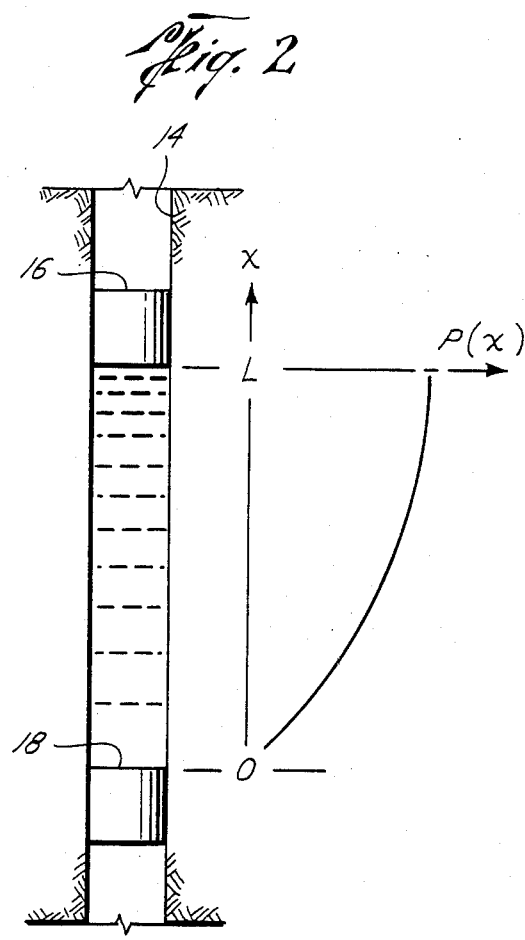
FIG. 2 is a schematic representation showing the quarter wave configuration.

The fundamental operational theory of the present invention is illustrated schematically in FIGS. 1 and 2. In those figures, a borehole 14 is drilled into the earth's surface, normally in a vertical orientation. At a location of interest in the borehole an operating head containing a relatively compressible gas bladder, illustrated schematically at 18 is placed into position. A second operating head 16 is located a preselected distance up the borehole from the operating head 18. Borehole fluid is captured in the space between devices 16 and 18. In the embodiment of the invention illustrated in FIG. 1 the device 16 would contain a second compressible gas bladder similar to the gas bladder in operating head 18. In the embodiment schematically illustrated in FIG. 2, the device 16 would be a non-compressible blocking device placed in the borehole 14.

As was previously indicated, the invention provides a situation wherein a desired acoustic impedance mismatch occurs between the fluid in the borehole and the devices 16 and 18. In the embodiment shown in FIG. 1 the devices 16 and 18 would have a lower acoustic impedance than the borehole fluid. In the embodiment shown in FIG. 2 the device 16 would have a higher acoustic impedance than the borehole fluid and the device 18 would have a lower acoustic impedance than the fluid. Although the invention is described for purposes of illustration in terms of providing compressible gas bladders as the elements having lower acoustic impedance, it will be understood that other elements could also be used, such as a floating piston arrangement that is free to move in response to incident pressure waves on the active side of the element.

In the technique illustrated in FIG. 1 the devices 16 and 18 would be spaced so that when the fluid between them was excited into oscillation one half of a standing wave would be created between the devices. In the operation of the device illustrated in FIG. 2, the distance between the devices 16 and 18 would be selected so that one quarter of a standing wave would be created between the devices when the fluid was excited into oscillation.

When it is desired to operate the method and apparatus of the invention in a quarter wave mode, one of the end elements, such as shown at 16 in FIG. 2 and 44 in FIG. 5 must be relatively non-compressible and present a higher acoustic impedance than the borehole fluid so that incident waves impinging upon the element are reflected substantially in phase. The elements 16 in FIG. 2 and 44 in FIG. 5 are configured to fit into the borehole so as to provide a fluid tight seal, but may be either rigid in the borehole, that is, vertically fixed in position, or may be slidable in the borehole.

Turning to FIG. 3 a device useful in the method generally illustrated in FIG. 1 is shown. The device comprises an elongated tool 10 adapted to be located down a borehole 14. At the lower end of the tool is an operating head 18 and shown in substantially greater detail in FIG. 6. At the uphole end of the tool is a similar operating head 16. A conduit 20 interconnects the operating heads 16 and 18 and includes an expanded collar 22 in the central portion thereof and shown in enlarged view in FIG. 4. Located within the collar 22 are a motor 28, a piston chamber 26 and a balance chamber 30 the function of each of which will be described in more detail as the specification proceeds. Provided in the central portion of the collar 22 are one or more flexible diaphragms 24 in fluid communication through conduit 25 with piston chamber 26.

The movement of the heads 16 and 18 will be described in more detail hereinafter. However it should be noted in FIG. 3 that the bellows 53a in the upper head 16 is shown in a substantially closed position whereas the bellows 53b in the lower head is shown in a more expanded or open position. In actual operation the heads 16 and 18 move symmetrically with respect to collar 22, and the positions of the bellows 53a and 53b in FIG. 3 are for purposes of illustrating their function.

In normal oil or gas well drilling operations, the well bore 14 is typically filled with a liquid drilling fluid commonly referred to as drilling mud. Hence the space between the heads 16 and 18, as well as the space around the heads and above and below them in the borehole will normally be filled with drilling mud. As was previously pointed out, however, the borehole fluid used in the practice of the invention can be any fluid commonly found in or provided to a borehole during drilling, production, testing, or completion of oil and gas operations. As shown in FIG. 4, the collar 22 includes an electric motor 28 connected to a source of power (not shown) through wires 40 and 40'. The motor 28 operates a piston 27 within chamber 26 (see FIG. 10). On the side of the piston which is in communication with the conduit 25 there will typically be provided a liquid such as hydraulic fluid. On the opposite side of the piston within chamber 26 there will normally be provided a gas the pressure of which is regulated by means of a balance chamber 30 and a gas regulator 36.

As the piston within chamber 26 is driven in reciprocating motion by means of the motor 28 it attempts to pump hydraulic fluid in and out of conduit 25 and hence exert alternating increased pressure and decreased pressure against flexible diaphragm 24. Both sides of the piston are at local ambient pressure in the borehole so that the motor 28 sees only the oscillating pressure load and not the static load in the hole. The balance chamber 30 is of substantially larger volume than the hydraulic fluid side of the piston chamber 26 and conduit 25 so that small movements of the piston 27 create negligible pressure changes on the gas side of the piston. The movement of diaphragm 24, which is surrounded by drilling mud on the side of the diaphragm exterior to collar 22 causes corresponding movement within the column of drilling fluid between operating heads 16 and 18. The frequency of those oscillations is controlled so as to produce a resonant standing wave within the space between operating head 16 and 18. In the case of the configuration of the tool as shown in FIG. 3 the distance between the operating head 16 and operating head 18 and the frequency of oscillation of the diaphragm 24 will be chosen so that a standing half wave will occur in the fluid between the two operating heads.

Turning now to FIG. 5 there is shown a modified version of the device which is used when it is desired to produce a quarter wave oscillation in the fluid. In this case, the device includes a single operating head 18 which is identical in construction to that previously described in connection with the alternate embodiment. However on the uphole end of the tool is a rigid operating head 44. Around the exterior of the operating head 44 are packers 46 and 48 which are provided to allow the operating head 44 to be firmly engaged with the sidewalls of the borehole 14 so as to prevent the passage of drilling fluid around the packers 46 and 48.

A driving mechanism similar to that earlier described is provided within operating head 44, namely motor 28, piston and chamber 26, balance chamber 30, and regulator 36. In this embodiment, the flexible diaphragms 24 are located on the downhole side of operating head 44. Conduit 20 extending between the operating head 44 and operating head 18 is in this case continuous throughout its length and contains no expanded collar 22 as in the earlier described embodiment.

The embodiment shown in FIG. 5 operates on the principle described schematically in FIG. 2 wherein the oscillations within the drilling fluid between the operating head 44 and the operating head 18 establish a quarter wave length standing wave. In this embodiment it is important that one end of the tool include an operating head having a compressible bladder as described herein, the other end having a non-compressible operating head in fluid tight engagement with the borehole 14, which as explained above may be fixed in position or in sliding engagement with the borehole.

As previously indicated FIGS. 1 and 2 schematically illustrate the principles of operation of the devices. The letter x identifies the distance along the vertical axis of the borehole. The numeral 0 indicates the beginning of the length of interest occurring at the top face of the lower operating head. The letter L indicates that length along the x axis wherein the peak pressure amplitude occurs in a sinusoidal wave. The notation 2L indicates that point in which the pressure excursion decays to 0, which in resonance takes place at the bottom of the upper operating head in the half wave configuration shown in FIG. 1.

The pressure as a function of location along the borehole between the operating heads and time is given by the equation:

$$P_{(x,t)} = P_O \sin(\pi c t / 2L) \sin(\pi x / 2L) + P_B$$

where
C = borehole fluid compressional sound speed;
$P_B$ = borehole static pressure;
$P_O$ = the maximum driven dynamic pressure;
t = time
x = distance along the borehole.

Hence, the frequency of the oscillator is given by the equation:

$$f = c/4L$$

In the arrangement shown in FIG. 1, the fluid motion is zero at x=L and maximum at x=0 and x=2L. In the embodiment illustrated in FIG. 2 the fluid motion would also be zero at x=L and maximum at X=0.

In order to allow the fluid to oscillate between the operating heads it is necessary to provide lower acoustic impedance at the points of maximum fluid motion. Hence in the embodiment shown in FIG. 1 both operating heads 16 and 18 would be provided with compressible gas bladders as hereinafter described, whereas in the embodiment as shown in FIG. 2 the operating head 16 would be rigid and the operating head 18 would be provided with a compressible gas bladder.

From the foregoing description it can be seen that the resonant frequency of oscillation of the fluid between the operating heads can be controlled in several ways. One such way is to vary the distance between the two operating heads. Referring to FIGS. 6 and 7 details of the construction of the operating heads are shown. It will be understood that the selection of the particular operating head can be varied by those skilled in the art. As shown in FIG. 6, an operating head may comprise a rigid chamber 50 at one end and a rigid collar 52 at the other, the collar 52 being open at the side facing the oscillating fluid. Mounted within the collar 52 is a compressible gas bladder 64. Although shown in section in FIGS. 6 and 7, it will be understood that the collar 52 and the gas bladder 64 are annular in shape and extend around the circumference of conduit 20. A gas line 62 extending from a gas source or regulator 60 is in communication with bladder 64 and may be used to maintain the bladder at the desired degree of inflation. The gas source may be carried in the tool as shown at 60, or may be at the surface in which case a regulator 60 would be provided in the tool.

Various gases may be used to inflate the bladder 64 depending upon the exact nature of the operating conditions into which the tool is placed. For example, if the tool is to be used at locations very near the surface of the earth, that is very shallow boreholes, air or nitrogen may be used. However for use in boreholes having ordinary operating depth of 5,000 to 15,000 feet below the surface, it is necessary to use a much lighter gas that will retain some compressibility at extreme operating pressures. Hence it is desired to use light gases such as helium, hydrogen or methane, with helium being the preferred gas because of its low molecular weight and inert nature. The bladders themselves are constructed from a high temperature elastomer.

In the embodiments where both operating heads include inflatable gas bladders, gas may be supplied to the second bladder from the source 60 through valve 61 and conduit 34.

Hydraulic fluid is contained within reservoir 66 and may pass through an orifice 65 into telescoping cylinders 58 and 56. By regulating the pressure of the hydraulic fluid through the orifice 65 the telescoping cylinders 54, 56, and 58 can be to move relative to each other to extend and retract the collar 52 and hence the inflatable bladder 64. This movement effectively changes the distance between the operating heads within the well bore. A bellows 53 is provided to protect the internal moving portions of the operating head from the drilling fluid exterior thereof.

An alternative moving mechanism is illustrated in FIG. 7 which provides a cable 70 which is attached at a top surface of collar 52 as shown at 76a, passes over an idler wheel 72 held on bracket 74 then passes along the entire length of the tool and around an operating mechanism (not shown in FIG. 7 but illustrated in FIG. 8) where it is attached once again to the lower portion of collar 52 shown as 76b.

A driving mechanism including a gear box 80 and a gear 82 is rotated by a power means (not shown) in order to drive the cable in one direction or another in race track fashion. As the cable moves, the collar 52 is made to move along conduit 20 in either direction, depending upon the movement of the cable.

The purpose of moving the heads relative to each other is to change the resonant frequency of the fluid therebetween. Hence the heads may be moved in order to sweep frequencies of interest or they may be moved preselected distances between operations to generate discrete frequencies of interest. The ease of moving the heads without removing the tool from the borehole allows for very flexible operations.

As an alternative to moving the operating heads in order to change the resonant frequency of the tool, the technique illustrated in FIG. 9 may be employed. In that embodiment an expandable sleeve of rubber or other elastic material is provided over conduit 20 and held in place at the various periodic locations along its length by clamps 86. The sleeve may be inflated by pumping a gas between the sleeve and conduit 20 to cause the sleeve to bulge out in those areas between the clamps 86 as shown in FIG. 9. When the tool is in an operating position in a borehole the expansion of the sleeve will cause some of the space that was otherwise occupied by borehole fluid to be occupied by a gas and hence the apparent compressibility of the borehole fluid will be altered. In this way the resonant frequency of oscillation may be varied.

The operation of the devices is shown schematically in FIG. 10. A piston 27 within cylinder 26 is moved in reciprocating motion by suitable crank mechanism 29 driven by motor 28. On one side of the piston 27, the left side as viewed in FIG. 10, a liquid such as hydraulic fluid is provided through a conduit 38 from a source which may be located at the surface if desired or carried aboard the tool. The liquid side of the piston 27 is in communication with diaphragm 24 via conduit 25. On the other side of the piston 27, the right side as viewed in FIG. 10, is a gas volume 30 controlled by regulator 36 to a pressure equal to the local borehole ambient pressure and provided through a gas supply line 34. The gas volume 30 counter balances the static borehole pressure and allows the motor 28 to see only the oscillating pressure load. Thus a piston 27 reciprocates within cylinder 26, diaphragm 24 is moved in corresponding oscillating fashion and sets up similar oscillations within the fluid in the borehole.

A transducer 42 is provided to measure the pressure in the borehole fluid which is then fed as a signal to controller 88 which in turn may vary the rpm of the motor 28 in order to control the excitation frequency in the fluid and consequently the amplitude of the pressure excursions. A tachometer 90 is provided for precise reading of the rpm and to feedback a signal to the controller 88.

Suitable gas from a gas supply located either at the surface or carried onboard the tool is fed through gas supply lines 34, valves 61 and into the inflatable gas bladders 64 in a manner described above.

As previously indicated the distance between the operating heads directly effects the natural resonant frequency of the fluid therebetween. As the operating heads are moved toward each other symmetrically with relation to the diaphragm 24 the natural resonant frequency increases. By observing the relative phase of the piston 27 and the induced AC component of borehole pressure, an indication is derived of the relation of exciting frequency to instaneous natural frequency of the cavity between the gas bladders 64. The phase shift relative to the phase shift at peak resonance is used to generate a motor command to speed up or slow down the excitation frequency so that the excitation is kept at or near the natural resonant frequency of the cavity generating the maximum or desired pressure response for given input.

Control of the borehole AC pressure amplitude may be achieved in one of two ways. A measure of the amplitude may be fed back to control piston displacement. In an alternative embodiment the amplitude signal may be used to control phase with respect to phase shift at peak resonance to operate somewhat away from resonance thus controlling gain rather than excitation level.

Thus the invention provides a technique for generating seismic waves in the earth by an apparatus placed in a borehole which can be very accurately controlled both in terms of the amplitude of pressures generated in the borehole as well as the frequency of the seismic wave. The peak pressure can be varied by controlling the pumped pressure of the fluid. The resonant frequency can be varied by either varying the distance between the operating heads or by varying the apparent compressibility of the fluid as described in detail above.

While in the foregoing specification the invention has been described in considerable detail, such detail is provided for the purposes of illustration and not by way of limitation, the invention itself being defined by the scope of the appended claims.

We claim:

1. A method for creating seismic waves in the earth from a borehole comprising the steps of:
    (a) providing first and second end means in said borehole, said first and second end means being vertically spaced apart a preselected distance to define a borehole space therebetween;
    (b) providing a fluid in said borehole space;
    (c) exciting said fluid into oscillation within the borehole space between said first and second end means, said fluid being oscillated at a frequency sufficient to create and maintain a resonant standing pressure wave between said first and second end means; and
    (d) varying the resonant frequency of oscillation over a range of frequencies.

2. The method of claim 1 wherein said fluid is excited in a pulsating fashion at a frequency selected to establish resonance in the borehole space between said first and second end means.

3. The method of claim 1 wherein said preselected distance is determined and varied so as to provide resonant frequencies in a frequency useful for seismic signals.

4. The method of claim 3 wherein said preselected distance is one-half the wavelength of said resonant frequencies useful for seismic signals.

5. The method of claim 3 wherein said preselected distance is one quarter of the wavelength of a preselected resonant frequency useful for seismic signals.

6. The method of either of claims 3 or 4 wherein said resonant frequency is in the range of about 10 Hz to about 200 Hz.

7. An apparatus for generating a seismic wave in a borehole containing a fluid comprising:
  (a) a pair of end means positioned in said borehole and separated from each other by a preselected vertical distance;
  (b) means communicating with the fluid in said borehole space between said end means for inducing oscillations in said fluid whereby the fluid within said space generates a resonant standing pressure wave; and
  (c) means for varying the resonant frequency of oscillation of said fluid over a range of frequencies.

8. The apparatus of claim 7 wherein at least one of said end means includes a compressible volume in communication with said oscillatory fluid.

9. The apparatus of claim 8 wherein said compressible volume comprises a gas filled bladder.

10. The apparatus of claim 9 wherein said gas is selected from the group comprising hydrogen, helium, methane, air, and nitrogen.

11. The apparaturs of claim 10 wherein said gas is helium.

12. The apparatus of any of claims 7 through 11 wherein said means for varying the resonant frequency comprises means for moving at least one of said end means with respect to the other.

13. The apparatus of any of claims 7 through 11 wherein said fluid located in said borehole space is drilling mud.

14. The apparatus of claim 7 wherein at least one of said end means is in rigid fluid tight contact with said borehole.

15. The apparatus of claim 14 wherein one of said end means is in rigid fluid tight contact with said borehole and the other of said end means includes a compressible gas bladder.

16. An apparatus for use in a borehole containing fluid for generating a seismic wave in the earth, said apparatus comprising:
  (a) first and second end means positioned in said borehole and separated from each other by a predetermined vertical distance, said first and second end means each including a compressible gas filled bladder;
  (b) connecting means between said first and second end means and including a central portion;
  (c) means housed within said central portion for inducing oscillations in said fluid between said first and second end means, whereby the oscillations of said drilling fluid generate a resonant standing pressure wave; and
  (d) means for varying the resonant frequency of oscillation of said fluid over a range of frequencies.

17. The apparatus of claim 16 wherein said means for inducing oscillations comprises a moveable diaphragm in contact on one side thereof with said fluid and in fluid communication on the other side thereof with a reciprocable piston, whereby the reciprocating motion of said piston causes a corresponding displacement of said moveable diaphragm.

18. The apparatus of claim 16 wherein said means for varying the resonant frequency comprises means for moving said first and second end means relative to each other whereby the natural resonant frequency of the fluid column therebetween may be varied over a range of frequencies.

19. An apparatus for generating a seismic wave in the earth from a borehole containing fluid, said apparatus comprising:
  (a) first non-compressible end means positioned in said borehole in fluid tight position;
  (b) second end means vertically spaced from said first end means in said borehole, said second end means including a compressible gas bladder facing said first end means;
  (c) means located in said first end means for exciting said borehole fluid into oscillation between said first and second end means at a frequency of oscillation sufficient to create and maintain a resonant standing pressure wave between said first and second end means; and
  (d) means for varying the resonant frequency of oscillation of said fluid over a range of frequencies.

20. The apparatus of claim 19 wherein said means for exciting said borehole fluid comprises at least one moveable diaphragm mounted in said first end means in contact with said borehole fluid on one side thereof and in fluid communication with a reciprocable piston on the other side thereof, whereby reciprocation of said piston causes a corresponding displacement of said moveable diaphragm.

21. The apparatus of claim 16 wherein said means for varying the resonant frequency comprises an elastic sleeve fitted about at least a portion of said connecting means and means for inflating said sleeve.

22. The apparatus of claim 9 wherein said means for inducing oscillations in said fluid comprises means for oscillating at least a portion of said gas filled bladder.

23. The method of claim 3 wherein said preselected distance is one-quarter of the wavelength of said resonant frequencies useful for seismic signals and wherein said first end means is in rigid fluid tight contact with said borehole.

* * * * *